United States Patent [19]
Kasik et al.

[11] 3,765,905
[45] *Oct. 16, 1973

[54] CHEESE PRODUCT

[75] Inventors: Robert L. Kasik, Oaklawn; Anthony J. Luksas, Chicago, both of Ill.

[73] Assignee: Beatrice Foods Co., Chicago, Ill.

[ * ] Notice: The portion of the term of this patent subsequent to July 4, 1969 has been disclaimed.

[22] Filed: Feb. 16, 1971

[21] Appl. No.: 115,753

Related U.S. Application Data

[60] Continuation-in-part Ser. No. 824,259, May 13, 1969, Pat. No. 3,667,968, which is a continuation-in-part Ser. No. 824,250, May 13, 1969, Pat. No. 3,674,508.

[52] U.S. Cl................... 99/140 R, 99/115, 99/116, 195/96
[51] Int. Cl. .... A23c 19/02, A23c 19/12, A23l 1/26
[58] Field of Search................ 99/140 R, 115, 116, 99/140 R; 195/96

[56] References Cited
UNITED STATES PATENTS

| | | | |
|---|---|---|---|
| 2,805,950 | 9/1957 | Erekson | 99/116 |
| 3,365,303 | 1/1968 | Hedrick | 99/116 |
| 3,483,087 | 12/1969 | Christensen | 195/96 |
| 3,507,750 | 4/1970 | Murray | 99/116 X |

OTHER PUBLICATIONS

M. S. Marshall, J. Dairy Sci., 3, 406–13 (1920).

*Primary Examiner*—Morris O. Wolk
*Assistant Examiner*—Sidney Marantz
*Attorney*—Cushman, Darby & Cushman

[57] ABSTRACT

A cheese flavor is provided by adding a portion of natural cheese in the fermentation medium either prior to, during or after fermentation. The fermentation medium comprises a protein and carbohydrate which has been innoculated with an organism from the Genus Bacillus and an organism from the Genus Streptococcus. Fermentation is carried out in an air-tight fermenter.

26 Claims, No Drawings

CHEESE PRODUCT

This invention is a continuation-in-part of co-pending application Ser. No. 824,259, filed May 13, 1969, entitled "Cheese Flavors" (now U.S. Pat. No. 3,667,968), which application is in turn a continuation-in-part of co-pending application Ser. No. 824,250, filed May 13, 1969, entitled "Production of Cheese Flavors" (now U.S. Pat. No. 3,674,508).

As disclosed in co-pending application Ser. No. 824,250, it was discovered that particular organisms are responsible for the development of a basic cheese background flavor. This discovery allowed the isolation of these organisms and the growth thereof under conditions favorable for their rapid development. The organisms can thus be multiplied in a relatively short time with the development of a basic cheese background flavor. The so produced basic cheese background flavor can then be mixed with other cheese flavoring agents, including naturally produced cheese, which mixture results in a highly cheese flavored composition. The organisms which produce the cheese background flavor, in combination, are selected from the nontoxic members of the Genus Bacillus and the Genus Streptococcus. These organisms are grown in a fluid medium containing at least one protein and at least one carbohydrate.

However, it is disclosed in application Ser. No. 824,259, that after the combination of the Genus Bacillus and Genus Streptococcus are grown in the disclosed medium of a carbohydrate and protein, the resulting growth product may be further inoculated with the flavor organisms of naturally produced cheese and this inoculum is then further grown to produce a cheese flavor product which has both the basic cheesy background flavor as well as the specific flavor connected with the various natural cheeses.

While this process develops the cheese background flavor as well as the specific flavor connected with a natural cheese, the process does require additional time for completion of the two fermentations involved. Additionally, the product produced is a powdered product which does not have the taste feel of a powdered natural cheese. While this is insignificant for many flavoring applications, in some applications it is desirable not only to have the complete cheese flavor but a cheesy taste feel when consumed. In such applications, it is necessary to mix the cheese flavor with a portion of natural cheese in order to provide the cheesy taste feel.

Heretofore, it has been the practice to suspend a portion of naturally produced cheese in the ferment produced by the above noted processes, or in a resuspension of the powder produced thereby, and after thorough agitation and mixing, spray drying the suspension to produce a cheese flavored powder having the cheesy taste feel. This process, of course, required an additional mixing and suspension step, as opposed to the process where only the flavors themselves are produced and without the addition of a portion of natural cheese thereto. It would, of course, be advantageous to eliminate this additional step in the process, especially since the volumes involved require rather large handling and processing equipment, as well as the attendant expense connected therewith.

Therefore, it is an object of this invention to provide a process which obviates the above noted disadvantages and additionally produces a product which has not only a cheesy background flavor and a specific cheese flavor, but a cheesy taste feel. Other objects will be apparent from the following disclosure and claims.

Briefly stated, it has now been surprisingly discovered that natural cheese may be mixed with the fermentation medium of the above discussed co-pending applications and the fermentation thereof may be carried out in the presence of a natural cheese, but under conditions where the natural cheese in the fermentation medium is not substantially changed in its characteristic cheesy taste feel. After completion of the fermentation, the resulting product is handled in the same manner as that disclosed in connection with the aforementioned co-pending applications The disclosures of co-pending applications Ser. No. 824,250 and 824,259, fully identified above, are hereby incorporated by reference, and the complete disclosures of those applications will not be repeated herein. However, for convenience purposes a summary of those disclosures are set forth below.

The fermentation medium is one having at least one protein and at least one carbohydrate therein. The proteins in the medium which may be utilized by the organisms are not critical and may be, for example, animal proteins, e.g., milk, or vegetable proteins, e.g. soy bean protein, and like vegetable proteins. The organisms are also non-sensitive to the particular carbohydrate. Likewise, the particular percentage of protein and carbohydrate in the aqueous medium is not critical, but from 0.5 grams of protein per 100 grams of aqueous medium and from 0.5 grams of carbohydrate per 100 grams of aqueous medium to 35 grams of protein and 35 grams of carbohydrate per 100 grams of aqueous medium are suitable, especially 1 gram of protein and 10 grams of carbohydrate to 7.5 grams of protein and 5.5 grams of carbohydrate. Milk itself provides quite suitable proteins and carbohydrates in the above ranges and is, therefore, a suitable medium for growing the organisms. However, it is not necessary to use only milk, since other milk fractions or products may be used, for example, cream, whole milk, skim milk, milk solids (total milk solids or non-fat milk solids and like fractions or products).

While any non-toxic member of the Genus Bacillus and the Genus Streptococcus may be used, according to the above-mentioned applications, to produce a cheese background flavor with, also a more distinctive specific cheese flavor, particular members of the Genus Bacillus and Genus Streptococcus are chosen. Hence, for example, certain combinations of the organisms from the Genus Bacillus and Genus Streptococcus will produce a more specific cheddar cheese flavor along with the cheesy background flavor. The organisms which were found best for this purpose, from the Genus Bacillus were *alvei, cereus, cereus var. mycoides, megaterium, megatherium, subtilis, subtilis var. aterrimus, subtilis var. niger*, and from the genus Streptococcus were *cremoris, durans, faecalis, lactis*. Also within this group, a certain combination produces quite superior results in terms of the degree and distinctiveness of the cheddar flavor developed. This combination was the organisms *megaterium* and *megatherium* from the Genus Bacillus and the organisms *S. lactis-variation diacetilactis* (citrate fermenter) and *S.lactis-variation diacetilactis* (citrate non-fermenter) from the Genus Streptococcus.

The fluid medium is heated from at least 145°F. for 30 minutes to 295°F. for 15 seconds, or to pasteurization or sterility at any temperature and time, to substantially kill or retard the competition of naturally occurring organisms. The medium is then cooled to 130°F. or below and preferably below 100°F. The medium, however, must be maintained above 60°F. and preferably above 85°F. While the medium is maintained within the above-noted temperature range, it is inoculated with at least 10 organisms of the Genus Bacillus and at least 10 organisms of the Genus Streptococcus per gram of medium. More preferably, at least 100 organisms of each Genus are placed in the medium and for best results at least 1,000, e.g., 10,000 or more organisms of each Genus are placed in the medium. While the ratio of the organisms from the Genus Bacillus and the Genus Streptococcus is not narrowly critical, it is preferred that the ratio be between 25:75 to 75:25 (Bacillus to Streptococcus). Preferably the medium with the inoculant therein is stirred sufficiently to distribute the organisms throughout the medium. The stirring is, however, not critical since the organisms will naturally distribute throughout the medium within a reasonable amount of time. The inoculated medium, after stirring or allowing distribution of the organisms, is then sealed in an airtight container, e.g., by capping or flushing the head space of the container with an inert gas such as nitrogen, and maintained within the above-noted temperature range for 1 to 15 days, e.g., 3 to 5 days, during which a fermentation process takes place. Of course, if desired, longer times may be used, but the growth of the organisms tapers off considerably after 5 days and very little advantage is obtained in allowing the organisms to grow beyond a period of 5 days. The flush of nitrogen or the use of a sealed container is necessary, since the process must be carried out under microaerophillic conditions.

After the organisms have been allowed to grow, the product obtained thereby may be used in any desired way for providing the background cheese flavor. For example, the product may be concentrated to produce a high degree and distinctiveness of flavor, or it may be pasteurized and dried as a cheese flavored powder or it may be used to mix with an unaged cheese base or naturally aged cheese to make a flavored cheese or cheese product.

However, according to the process of Ser. No. 254,259, instead of using the ferment alone or mixing with a base such as naturally produced cheese, the ferment is inoculated with specific organisms to also produce a more specific cheese flavor. The inoculant may be the specific organisms responsible for producing the specific cheese flavor, e.g. *Penicillium roquefortii* (blue cheese) and Propionobacter (Swiss cheese), or it may be simply a small amount of the desired natural cheese which will, of course, have the natural flavor producing organisms therein. Only enough inoculant to start the further fermentation is required. This amount is of course, quite small, e.g. 10 to 100 or more organisms per gram of ferment (either isolated organisms or those contained in a natural cheese).

The inoculated ferment is then further fermented for at least 2 days and will be essentially completed within 20 days, especially 14 or 12 days. However, longer fermenting times can be used if desired, but little further flavor will develop with extended fermentation time.

The further fermenting is carried out at about 40° to about 130°F., depending on the particular natural cheese or cheese producing organism used in the inoculation step. The conditions of the further ferment should follow that known in the art for fermenting the natural cheese, e.g., use aeration when fermenting with Penicillium roquefortii, anaerobic to microaerophillic conditions for Italian cheese (reduced oxygen tension), all of which is well known in the art and no further details are considered necessary.

After the further fermentation, the resulting ferment may be a suspension of small particles, small curds or near a solution in the case of high proteolytic cheeses and will depend on the particular inoculant for further fermentation.

This suspension may be used directly as a liquid flavor composition or the composition may be spray dried to produce a powdered flavor composition. Alternately, the solids may be separated from the ferment and further processed in a variety of ways, e.g. by mixing with an edible base. Suitable edible bases are, for example, a natural or synthetic cheese, an animal or vegetable fat or protein, vegetable oil (liquid or hydrogenated) or a milk product or fraction (whey, dried milk solids, milk curds, etc.).

The present invention follows the process disclosed in application Ser. No. 824,250 in terms of inoculants, fermentation medium, fermentation conditions, and uses of the fermentation product. However, the present invention departs both from application Ser. No. 824,250 and application Ser. No. 824,259. According to the present invention, a portion of naturally produced cheese is added to the fermentation medium of Ser. No. 824,250 either prior to, during or after the fermentation step. Since the basic fermentation is carried out in a closed system or in a system which has a flush of an inert gas, e.g., nitrogen, through the head space of the fermenter, it has been found that natural cheeses, in general, will not be significantly effected during the fermentation step, since most natural cheeses do not contain organisms which are substantially susceptible to growth under the fermentation conditions of the process. Hence, the natural cheese dispersed in the fermentation medium, will pass through the fermentation step substantially unchanged in character. However, for the few natural cheeses which do support some growth under the conditions of the fermentation step, such as Italian cheese, these cheeses should be added toward the end or at the end of the fermentation period, in order to insure that little, if any, change in character of the added natural cheese takes place. In either case, however, agitation during the fermentation step or at the latter part thereof, is more than sufficient to disperse particles of natural cheese in the fermentation medium. Hence, the resulting fermentation medium not only has the background cheese flavor growth product therein, but additionally has a portion of natural cheese dispersed therethrough and results in a product which also has the cheesy taste feel, necessary for some applications of a cheese flavored product.

The resulting fermentation product with the natural cheese dispersed therein may be handled in the manner disclosed in either of applications Ser. Nos. 824,250 or 824,259. For example, the fermentation medium may be simply spray dried to a powder or it may be concentrated, e.g. by vacuum drying, to a concentrated liquid.

Alternately, the fermentation medium may be simply pasteurized and used as a liquid flavoring product. Or again, it may be mixed with an edible base such as an animal or vegetable fat or protein, vegetable oil (liquid or hydrogenated) or a milk product or milk fraction (whey, dried milk solids, milk curds, etc.). In any of the cases, however, the fermentation product during the subsequent processing steps should be heated to pasteurization or sterility to prevent any further fermentation while the product remains in the package or composition in which it is placed.

The amount of naturally produced cheese added to the fermentation medium may be chosen completely as desired with the only reservation of that the amount of cheese added should not be so great as to render the fermentation medium so viscous that it is difficult to stir. On a total solids basis of the mixture of fermentation medium and natural cheese added thereto, the amount of natural cheese may vary from as low as about 1 percent by weight to as high as about 80 percent by weight. However, for most applications, about 4 to 65 percent by weight are preferred. The naturally produced cheese may be added to the fermentation medium in any manner desired, but it is preferred that the cheese be comminuted to some reduced size before addition to the fermentation medium. This will speed up the dispersion of a natural cheese in the fermentation medium. However, if desired, the cheese may be added in lump form and dispersed with additional agitation in the fermenter.

Any natural cheese may be used in the present process, such as cheddar, Swiss, Italian, Brick, mozzarella, Romano, Parmesan, Neufchatel, etc. The particular natural cheese is not at all critical, since as noted above the cheese passes through the fermentation step essentially unchanged and essentially does not effect the fermentation, since the conditions of fermentation, as noted above, are not conducive to substantial growth of the natural organisms contained in natural cheese. This is the main departure from Ser. No. 824,259, in that according to that process, after the initial fermentation according to 824,250, the fermentation conditions are changed so that the natural cheese placed in the fermentation medium will become active and produce an additional fermentation.

The invention will be illustrated by the following examples, but it should be carefully noted that the invention is not limited to the specific embodiment described in the examples.

EXAMPLE 1

PRODUCTION OF THE INOCULANT

Skim milk having 22 percent total solids was heated to 145°F. for 30 minutes to substantially destroy any pathogens and to reduce the number of competitive organisms. The skim milk was then cooled to 92°F. and placed in a sterile fermenter having one-fifth of its volume as a head space. The fermenter was maintained at 92°F. The skim milk was inoculated with approximately 3,000 organisms per gram of the medium of the organism S.lactis-variation diacetilactis (citrate fermenter) and approximately 3,000 organisms per gram of the medium of the organism S.lactis-variation diacetilactis (citrate non-fermenter). The skim milk was also inoculated with approximately 2,000 organisms per gram of aqueous medium of B.megaterium and approximately 2,000 organisms per gram of the medium of B.megaterium. The inoculated skim milk was maintained at 92°F. for 5 days during which the organisms therein proliferated.

EXAMPLE 2

PRODUCTION OF THE CHEESE FLAVOR

Skim milk having 15 percent total solids was heated to 145°F. for 30 minutes to substantially destroy pathogens and to reduce the number of competitive organisms. The skim milk was cooled to 92°F. and placed in a fermenter maintained at 92°F. The skim milk was then inoculated with the product of Example 1 wherein the resulting inoculated skim milk had a total of approximately 10,000 organisms per gram of skim milk and a ratio of the Bacillus organism to the Streptococcus organisms was approximately 60/40. The inoculated skim milk was stirred for 35 minutes to disperse the organisms therein. The inoculated skim milk was then sealed in an airtight manner in the fermenter and 1/5 of the volume of the fermenter remained as a head space. Fermentation was carried out at 95°F. for three days. Thereafter, the fermenter was opened under a blanket of nitrogen and cut particles of naturally produced cheddar cheese was placed in the fermentation medium. The amount of cheese added, on a solids basis of the fermentation medium and cheese added, was approximately 33 percent by weight. The fermenter was closed and stirring was carried out until the cheese was suspended. The stirring time was about 1½ hours. Fermentation was then allowed to resume for an additional one day. The mixture of cheese and fermentation produced was pasteurized at 145°F. for 30 minutes and then spray dried in a conventional manner to a fine powder having a complete cheddar cheese taste and taste feel.

EXAMPLE 3

On a dry basis was mixed 50 percent solids of Example 2, 31.3 percent acid whey powder, 4 percent salt, 5 percent disodium phosphate (a dispersing agent), 0.5 percent USDA Yellow No. 5, the remainder being dry milk solids. After thorough mixing a portion thereof was dispersed with vigorous stirring in water and spray dried to form a cheese flavored powder. The cheese powder was a fine textured powder having a very distinctive and medium degree of cheddar cheese flavor.

EXAMPLE 4

A second portion of the product of Example 3 was mixed with an equal portion by weight of milk solids and produced a cheddar cheese spread of mild cheese flavor.

EXAMPLE 5

A third portion of the product of Example 3 was mixed with an equal portion of vegetable fats and produced a mild cheddar cheese dip.

EXAMPLE 6

Equal portions of the product of Example 3 and whey solids were mixed to produce a medium to mild cheese flavored powder for sprinkling on salads and the like.

EXAMPLE 7

On a dry weight basis, there was mixed 50 percent of the fermented solids of Example 2, 25 percent acid whey powder, 15 percent butter fat, 0.5 percent Atmos 150 (monoglyceride emulsifier), 4 percent salt, 5 percent disodium phosphate and 0.5 percent USDA Yellow No. 5. This product after being thoroughly mixed was cut into wedges and produced an excellent cheddar cheese flavored product.

EXAMPLE 8

The procedure of Example 2 was repeated except the organisms used in the inoculant were *Streptococcus thermophilus* and *Bacillus stereothermophilus* and the natural cheese was blue cheese. The product has a very distinct blue cheese flavor and taste feel.

EXAMPLE 9

The procedure of Example 2 was repeated except that the organisms used in the inoculant were *Bacillus cereus* and *Streptococcus cremoris* and the natural cheese was Swiss cheese. The product produced had a Swiss cheese flavor and taste feel.

What is claimed is:

1. A fermented and pasteurized cheese flavor composition comprising a pasteurized aqueous fermentation medium containing at least one protein, at least one carbohydrate and portion of a natural cheese therein, and said medium containing the fermented growth products of a combination of organisms consisting essentially of at least 10 organisms per gram of the medium of at least one first non-toxic member of the Genus Bacillus, and at least 10 organisms per gram of the medium of at least one second non-toxic member of the Genus Streptococcus, said natural cheese in the fermentation medium being sub-stantially unchanged during the formation of the fermented growth products.

2. The composition of claim 1 wherein said first member is selected from the group consisting of *Bacillus alvei, cereus, cereus var. mycoides, megaterium, megatherium, subtilis, subtilis var. aterrimus* and *subtilis var. niger*.

3. The composition of claim 1 wherein said second member is selected from the group consisting of *Streptococcus cremoris, durans, faecalis and lactis*.

4. The composition of claim 1 wherein the said first member is both *Bacillus megaterium* and *Bacillus megatherium* and the said second member is both *Streptococcus lactis var. diacetilactis* (citrate fermenter) and *Streptococcus lactis var. diacetilactis* (citrate non-fermenter).

5. The composition of claim 1 having at least 10,000 organisms per gram of the medium of each first and second member.

6. The composition of claim 1 in a dried form.

7. The composition of claim 1 wherein the amount of natural cheese, on a basis of percent by weight of total solids, is between about 1% and 80%.

8. The composition of claim 1 wherein the said aqueous fermentation medium is at least in part a milk product.

9. The composition of claim 8 wherein the milk product is selected from whole milk, skim milk and milk solids.

10. The product of claim 1 in admixture with an edible base.

11. The product of claim 10 wherein the edible base is a cheese, milk or milk fraction, fat or synthetic cheese flavor.

12. The product of claim 10 in a dried form.

13. In a process for producing a cheese flavor comprising pasteurizing an aqueous medium containing a protein and a carbohydrate, inoculating the pasteurized aqueous medium with a combination of organisms consisting essentially of at least 10 organisms per gram of medium of at least one non-toxic member of the Genus Bacillus and at least 10 organisms per gram of medium of at least one non-toxic member of the Genus Streptococcus, and growing the combination of organisms and fermenting the medium until a cheese flavor develops, the improvement comprising placing a portion of natural cheese in the medium either before or during the fermentation, and wherein the fermentation is carried out under conditions that the natural cheese passes through the fermentation step essentially unchanged.

14. The process of claim 13 wherein the medium is allowed to ferment for up to 15 days.

15. The process of claim 13 wherein the medium is allowed to ferment for about 3 to 5 days.

16. The process according to claim 13 wherein the medium is pasteurized after the cheese flavor develops.

17. The process of claim 13 wherein the aqueous medium is pasteurized at a temperature of at least 145°F., for 30 minutes and the pasteurized medium is cooled to between 130°F. and 60°F. prior to said inoculating step.

18. The process of claim 17 wherein the ratio of the organism of the Genus Bacillus to the organisms of the Genus Streptococcus is between 25:75 to 75:25, respectively.

19. The process of claim 13 wherein after the fermentation step is conducted in an airtight container at 60°F to 130°F for at least about 1 day whereby the medium ferments.

20. The process of claim 19 wherein the head space of the airtight container is flushed with an inert gas.

21. The process of claim 13 wherein the Bacillus organisms are selected from the group consisting of *Bacillus alvei, cereus, cereus variation mycoids, megaterium, megatherium, subtilis, subtilis variation aterrimus* and *subtilis variation niger*.

22. The process of claim 21 wherein the Streptococcus organisms are selected from the group consisting of *Streptococcus cremoris, durans, faecalis and lactis*.

23. The process of claim 22 wherein the Bacillus organisms are both *Bacillus megaterium* and *Bacillus megatherium* and the Streptococcus organisms are both *Streptococcus lactis-variation diacetilactis* (citrate fermenter) and *Streptococcus lactis-variation diacetilactis* (citrate non-fermenter).

24. The process of claim 13 wherein the amount of natural cheese, on a basis of percent by weight of total solids, is between about 1 percent and 80 percent.

25. The process of claim 24 wherein the natural cheese is cheddar cheese, blue cheese, Roquefort cheese, Swiss cheese, or Italian cheese.

26. The process of claim 24 wherein the amount of natural cheese is between 4 percent and 65 percent.

* * * * *